P. CLARE.
HOOK.
APPLICATION FILED JUNE 8, 1918.

1,353,026. Patented Sept. 14, 1920.

Witnesses
JH Crawford
L. D. Middleton

Inventor
Peter Clare,
By Victor J. Evans
Attorney

UNITED STATES PATENT OFFICE.

PETER CLARE, OF VALLEY, WASHINGTON, ASSIGNOR OF ONE-HALF TO GEORGE W. WILSON, OF VALLEY, WASHINGTON.

HOOK.

1,353,026.  Specification of Letters Patent.  Patented Sept. 14, 1920.

Application filed June 8, 1918. Serial No. 238,906.

*To all whom it may concern:*

Be it known that I, PETER CLARE, a citizen of the United States, residing at Valley, in the county of Stevens and State of Washington, have invented new and useful Improvements in Hooks, of which the following is a specification.

This invention relates to new and useful improvements in safety hooks and the principal object of the invention is to provide means for locking the movable part of the hook in engaging position.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
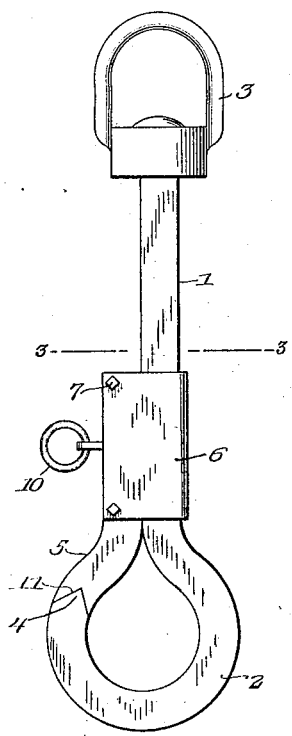
Figure 1 is a side view of the invention.
Figure 2:
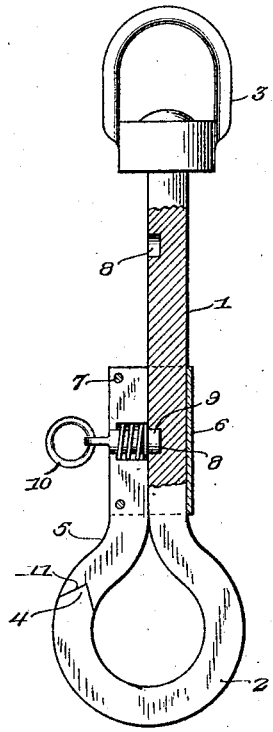
Fig. 2 is a longitudinal section.
Figure 3:
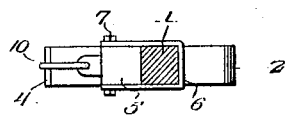
Fig. 3 is a transverse section on line 3—3 of Fig. 1.

As shown in these views the device includes the shank 1 having the hook 2 at one end thereof and its other end provided with the ring 3. The end of the hook is wedge shaped as at 4. 5 is the movable member which is carried by the U-shaped clip 6. The clip is secured to the member by means of the bolts 7 which pass through the free ends of the clip and through the body of the movable member as shown. The clip embraces the shank 1 so that said clip and movable member will move along said shank. Said shank on its front face is provided with a series of holes 8 and a spring pressed pin 9 carried by the movable member is adapted to engage with said holes to hold the movable member in any desired position on the shank. The outer end of the pin projects through the member and is provided with a ring 10 which forms a handle for withdrawing the pin from the holes. The end of the movable member is bent away from the shank and is provided with a V-shaped recess 11 in its end so that when the parts are pressed toward the hook said recess will receive the wedged shaped end of the hook as is clearly shown in Fig. 2. The hole nearest the hook is so positioned that the parts will be in firm engagement with the pin in said hole. In this manner the part engaged by the hook will be locked within the same so that it is impossible for the same to slip from the hook.

It is thought from the foregoing description that the advantages and novel features of my invention will be readily apparent.

I desire it to be understood that I may make such changes in the construction and in the combination and arrangement of the several parts, provided that such changes fall within the scope of the appended claim.

What I claim is:—

A hook of the class described comprising a shank having a hook at one end and spaced recesses in its front face, said hook having a wedge-shaped end, a U-shaped clip embracing said shank, a latch member bolted to the free end of said clip and having its end bent outwardly and provided with a V-shaped recess to receive the wedge-shaped end of the hook, a spring pressed pin carried by said latch member and adapted to engage one or the other of the recesses in the shank for holding the latch member in open or closed position and a hand engaging ring on the outer ends of said pin.

In testimony whereof I affix my signature.

PETER CLARE.